United States Patent [19]
Broer et al.

[11] Patent Number: 5,954,974
[45] Date of Patent: Sep. 21, 1999

[54] LASER-ASSISTED COATING REMOVAL FROM OPTICAL FIBERS

[75] Inventors: Matthijs Meno Broer, Elmira, N.Y.; Gary John Steiner, Easton; Claude Eugene Walraven, Longpond, both of Pa.

[73] Assignee: Lucent Technologies Inc., Murray Hill, N.J.

[21] Appl. No.: 08/936,980

[22] Filed: Sep. 25, 1997

[51] Int. Cl.[6] .............................. H01L 21/268; B08B 5/00
[52] U.S. Cl. .................................. 216/2; 216/24; 216/80
[58] Field of Search .................................. 216/2, 24, 80

[56] References Cited

U.S. PATENT DOCUMENTS

| | | | |
|---|---|---|---|
| 5,024,968 | 6/1991 | Engelsberg | 438/597 |
| 5,099,557 | 3/1992 | Engelsberg | 29/25.01 |
| 5,325,458 | 6/1994 | Morrow et al. | 385/125 |
| 5,395,480 | 3/1995 | Bhardwaj et al. | 216/24 |
| 5,531,857 | 7/1996 | Engelsberg et al. | 156/345 |
| 5,643,472 | 7/1997 | Engelsberg et al. | 216/65 |

*Primary Examiner*—Robert Kunemund
*Assistant Examiner*—Lynette T. Umez-Eronini

[57] ABSTRACT

A laser ablation process is described for removing the polymeric buffer layer from glass optical fibers. The ablation takes place within a flow of substantially non-oxidizing gas. In preferred embodiments, the fiber cable is flushed with dry nitrogen and irradiated by a sequence of laser pulses 200–800 $\mu$s in width. A currently preferred laser is a carbon-dioxide laser emitting in the infrared portion of the spectrum. The irradiating wavelength is preferably chosen to be 90% absorbed at a depth of 0.5 to 1.0 times the thickness of the buffer layer. The polymeric buffer layer can be removed without previously treating the optical fiber with a chemical softening agent, and without causing any significant reduction in the tensile strength of the fiber.

27 Claims, 7 Drawing Sheets

LASER-ASSISTED COATING REMOVAL FROM OPTICAL FIBERS

GOVERNMENT CONTRACT

This invention was made with Government support under Contract Number F33657-96-C-6817. The Government has certain rights in this invention.

FIELD OF THE INVENTION

The invention involves procedures for removing polymeric coatings, or buffers, from glass optical fibers. More specifically, the invention involves the use of lasers for removing such coatings.

ART BACKGROUND

A ubiquitous form of optical fiber cable consists of a glass optical fiber coated by a protective polymeric layer, often referred to as a buffer layer. The glass optical fiber is typically composed of a silica-based glass core, surrounded by a silica-based glass cladding.

In many operations involving such optical fiber cables, it is necessary to remove a section of the buffer in order to expose a section of the underlying glass fiber. Various chemical and mechanical methods have been proposed for performing such removal. However, practical experience has shown that it is difficult to remove the buffer without affecting the glass fiber in some manner that degrades its strength.

In fact, only a few methods of buffer removal are known that leave the fiber strength substantially unimpaired. (The fiber strength referred to here is typically the tensile strength, as measured by pull tests in which the fiber tension is increased to the breaking point.) All of these methods involve the use of hot sulfuric acid or other chemical agents to soften or remove the polymeric coating.

Hot sulfuric acid is often disadvantageous because it requires special handling procedures and constitutes a chemical safety hazard, both in case of contact with persons and objects, and in case of fume inhalation. Moreover, disposal of sulfuric acid in industrial settings may pose a danger to the environment. These disadvantages also apply to the use of organic solvents, such as methylene chloride, as buffer removers.

Thus, there remains a need for a method of buffer removal that is free of chemical safety hazards and is friendly to the environment, but substantially maintains the strength of the optical fiber.

SUMMARY OF THE INVENTION

In a broad sense, the invention involves using a laser to ablate a section of the buffer layer. We have found that if the ablation is performed in a flow of substantially non-oxidizing gas, it is possible to substantially preserve the tensile strength of the optical fiber. A currently preferred gas for flowing is dry nitrogen. A currently preferred laser is an infrared laser such as a carbon dioxide laser. Significantly, buffer removal is achieved in this manner even without previously treating the optical fiber with a chemical softening agent.

Accordingly, our invention in a broad aspect involves a method for removing a polymeric coating from a longitudinal section of a glass optical fiber. The method comprises bathing the fiber section in a flow of a substantially non-oxidizing gas, and during the bathing step, impinging a laser beam on the fiber section. This impingement is carried out such that the polymeric coating is removed by ablation from at least a portion of the fiber section.

DETAILED DESCRIPTION

We believe that various lasers will be useful for the practice of the invention, provided only that they emit radiation that is substantially absorbed by the polymeric buffer material, and can deliver energy doses effective for causing ablation of this material, as discussed in greater detail below. As will be understood by those skilled in the art, appropriate lasers will include lasers emitting in the ultraviolet portion of the electromagnetic spectrum, as well as lasers emitting in the infrared portion.

A currently preferred laser is a carbon dioxide laser emitting at an infrared wavelength. Such wavelengths typically fall in the range 9–11.8 $\mu$m. (We are currently using a laser emitting at 10.6 $\mu$m.) Although we believe that continuous (cw) operation will be useful in at least some cases for coating removal, we currently prefer to operate the laser in a pulsed mode. We have found that pulsed operation offers more precise control over the total energy dose delivered to the coated optical fiber. Furthermore, preliminary tests suggest that degradation of fiber strength is more easily avoided in pulsed operation.

Figure 1:
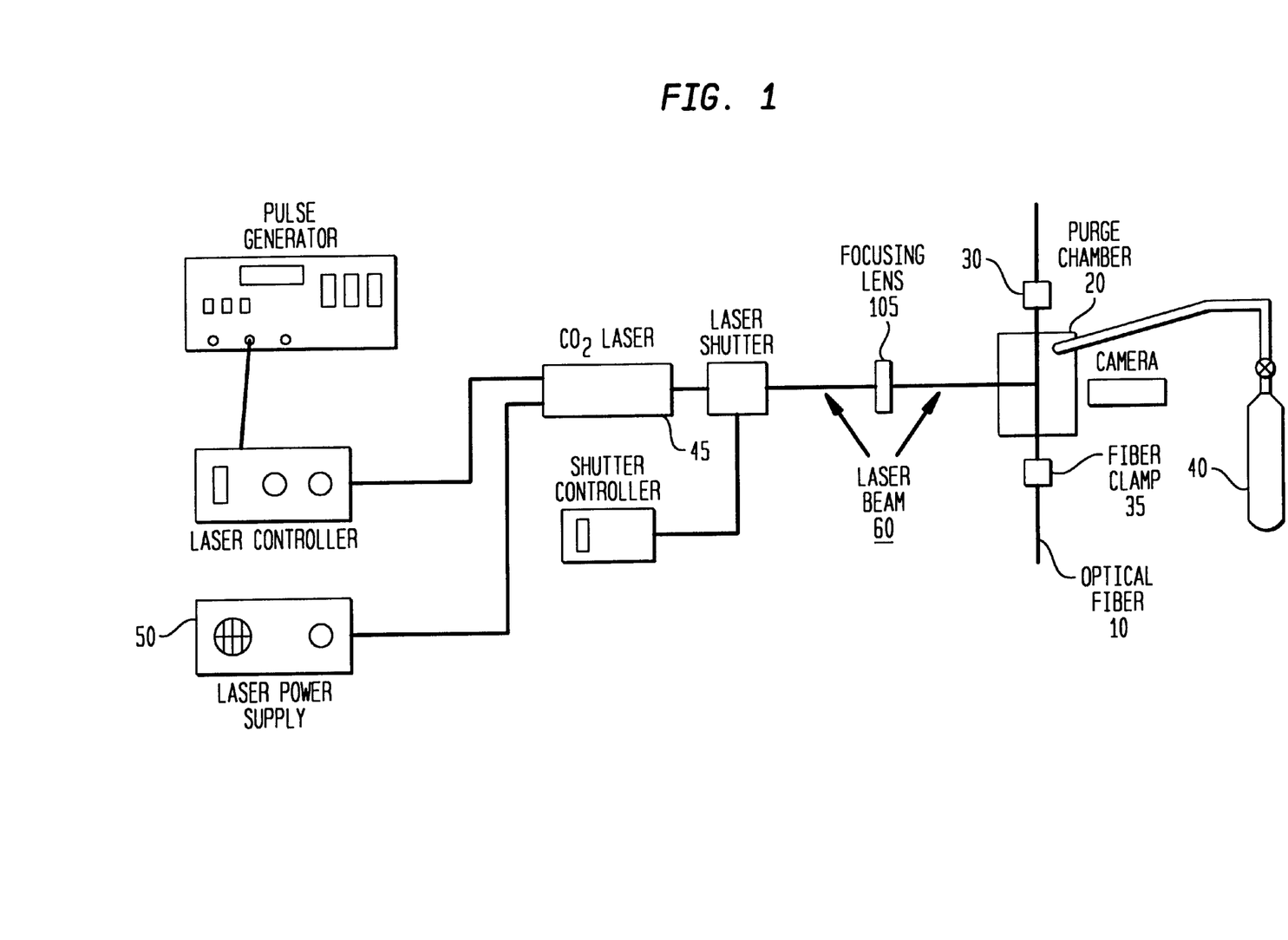
FIG. 1 is a schematic block diagram of an arrangement for irradiating an optical fiber with laser radiation, according to the invention in one embodiment.

FIG. 1 shows a typical installation for laser ablation of fiber coatings. (In this and subsequent figures, like reference numerals are used to indicate like elements.) Fiber 10 is threaded through purge chamber 20, and held in tension between clamps 30, 35. The amount of tension need only be sufficient to straighten the fiber section between the clamps.

We have found that a tension of several ounces (or, roughly, 0.3–1.0 N) is generally sufficient. Gas from reservoir 40 flows through the purge chamber. Using a chamber having a volume of about 160 cc, we have obtained good results using a flow of dry nitrogen of about 2360 cc per minute, and flushing at this flow rate for 0.5 minute before activating the laser.

Although dry nitrogen is currently preferred, we believe that other functionally inert gases will be useful, in at least some cases, for providing an appropriate non-oxidizing gas flow. These alternative gases include the noble gases helium and argon (as well as neon, krypton, and xenon), and also include hydrogen and various non-flammable gaseous fluorocarbon compounds. We believe that the flow-gas will be substantially non-oxidizing, and beneficial results will generally be obtained, provided the gas contains less than 1% oxygen. It should be noted in this regard that we have observed a trend toward better preservation of fiber strength as oxygen content is reduced. Thus, the best results should be expected with a flow-gas that has 99.9% or more of functionally inert components.

As is well-known in the art, exposure to atmospheric water vapor can result in the weakening of bare optical fibers. After the fiber coating has been removed in accordance with the invention, the resulting exposed section of bare fiber is subject to attack by water vapor. For this reason, it is desirable for the flow-gas to be substantially dry. We have found that nominally dry gas as provided by commercial vendors is acceptable in this regard. Alternatively, the flow-gas is readily treated by well-known drying methods, such as flow through a suitable drying column.

Figure 2:
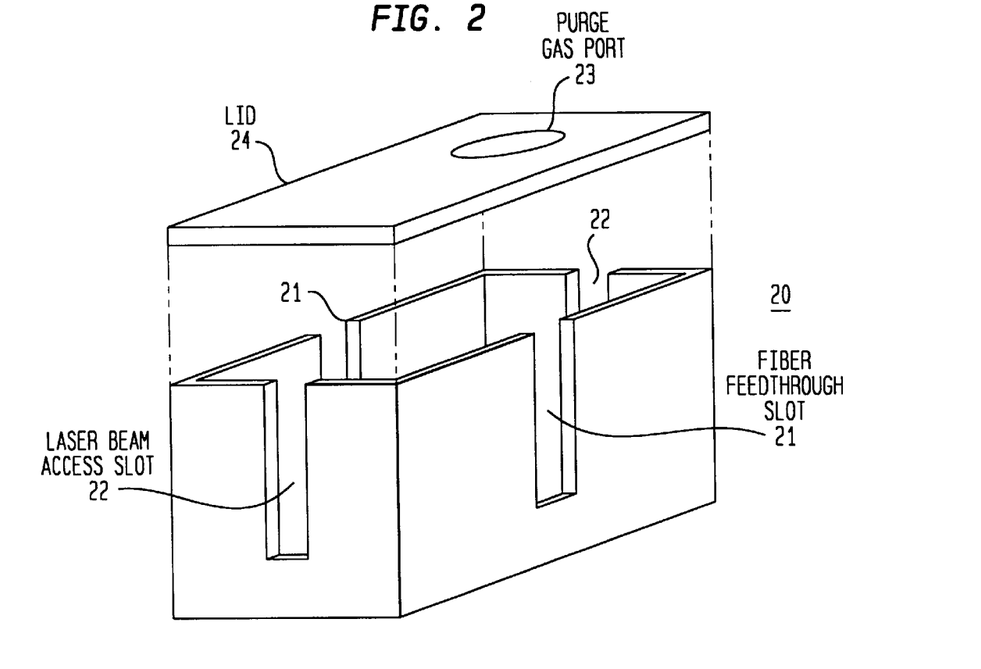
FIG. 2 is a perspective view of a purge chamber for bathing an optical fiber in a gas flow, according to the invention in one embodiment.

FIG. 2 depicts an exemplary purge chamber 20. Slots 21 are provided for feeding fiber 10 through the chamber. Slots 22 are provided for entry and exit of the laser beam. Port 23 is provided for entry of the purge gas. For convenient access to the inside of the purge chamber, it is advantageous to provide a removable lid 24.

Turning again to FIG. 1, laser 45 is powered by power supply 50. We have obtained good results using an HP 8112A Pulse Generator to drive a carbon dioxide laser in a pulsed mode. The laser we have used, which has a nominal continuous output power of 12 W, is a Model D48-1-115 laser commercially available from Synrad, 6500 Harbor Heights Parkway, Mukilteo, Wash., 98275.

Figure 3:
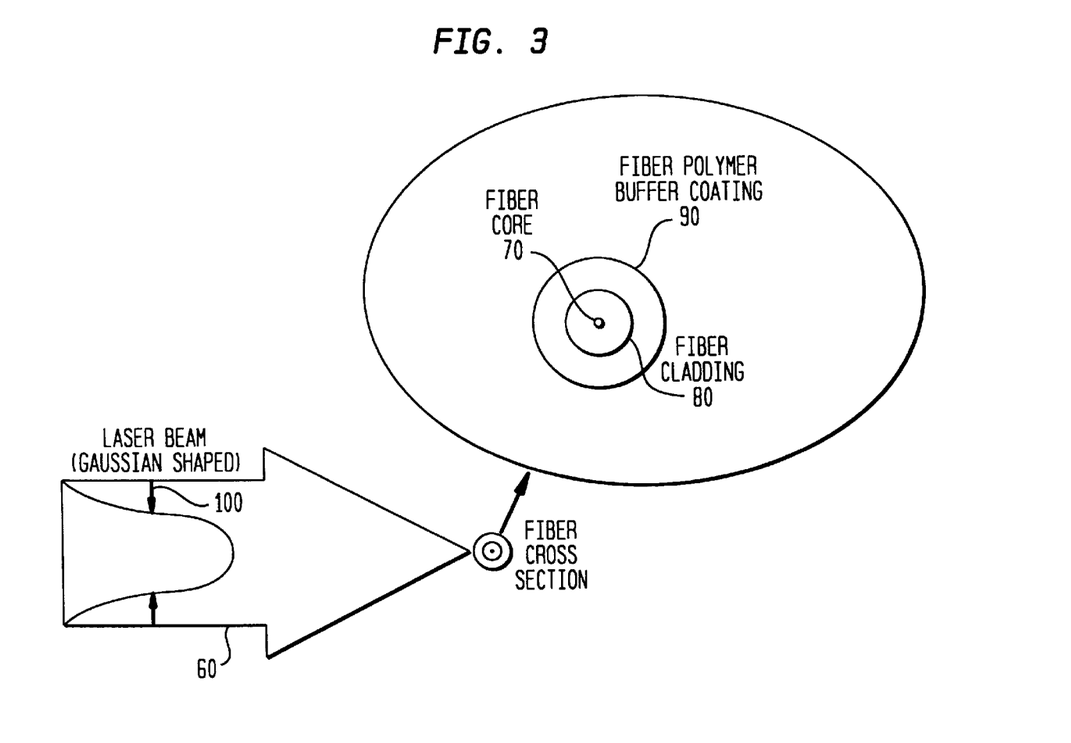
FIG. 3 is a schematic view, in cross section, of a laser beam impinging on an optical fiber.

FIG. 3 shows laser beam 60 impinging on an optical fiber having core 70, cladding 80, and polymeric buffer layer 90. The spot size of the beam at the fiber is indicated in the figure by cross section 100. In the figure, this cross section is shown as the full width at half-maximum of a Gaussian beam profile. Although not universal, such profiles are typical of the beams produced by carbon dioxide lasers.

Figure 4:
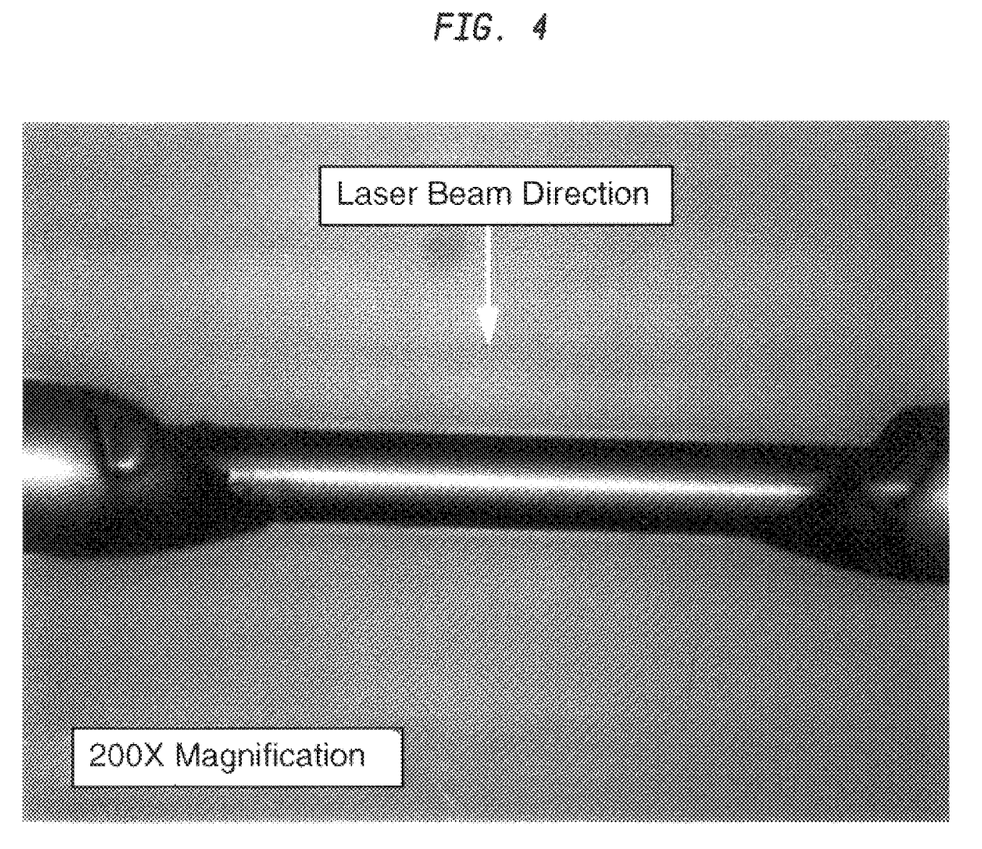
FIG. 4 is a rendering of a photomicrograph of a section of optical fiber that has been stripped in accordance with the invention, in one embodiment.

We have found it advantageous to focus the laser beam onto the optical fiber such that the spot size at the cable is larger than the glass optical fiber, and is preferably somewhat larger than the fiber with the buffer layer included. For example, we have obtained good results impinging a spot of about 1 mm diameter on a coated fiber having an outer glass diameter of 125 $\mu$m and an outer polymer diameter of 250 $\mu$m. We used a lens 105 (see FIG. 1) having a focal length of 10 inches (25.4 cm). The original beam diameter was approximately 0.35 cm. FIG. 4 shows the appearance of a typical fiber after ablation of the buffer layer.

Figure 5:
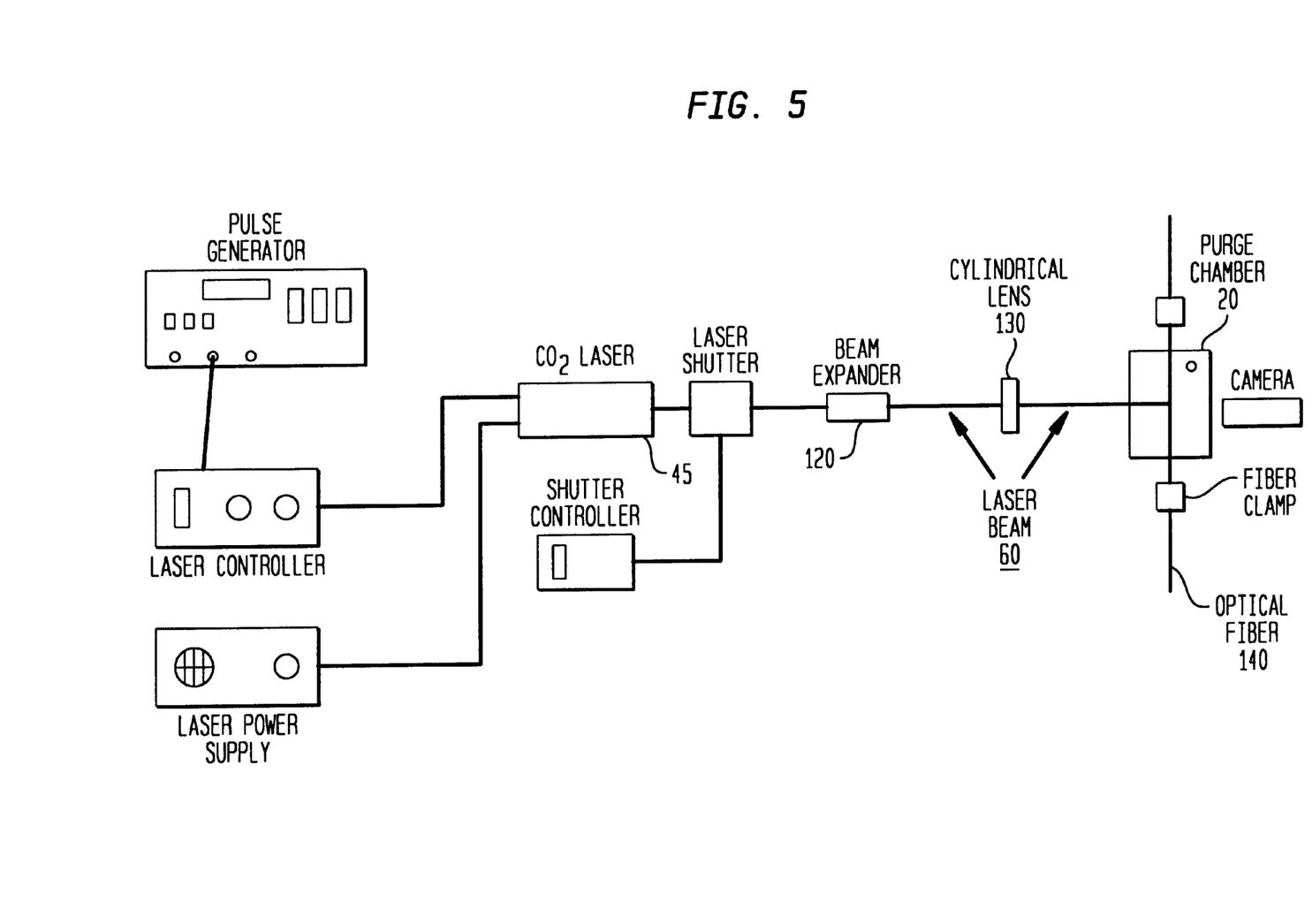
FIG. 5 is a schematic block diagram of an arrangement for irradiating an optical fiber with laser radiation, according to the invention in an alternate embodiment in which an elongated spot of laser light is impinged on the optical fiber.

A modest increase in the length of the exposed buffer section is readily achieved by interposing a cylindrical lens between the laser and the optical fiber in conjunction with an optical element for expanding the laser beam. As shown in FIG. 5, a convenient optical arrangement for that purpose includes laser 45, beam expander 120, cylindrical lens 130, and optical fiber 140. By way of illustration, we have used a cylindrical lens having a focal length of 5 inches (12.7 cm) to go from a 1-mm round spot to an approximately elliptical spot 7 mm long, which was effective for removing a buffer section about 4–5 mm long.

We have found that in many cases, effective coating removal can be achieved purely by one-sided illumination of the fiber. However, back illumination may be desirable in some cases, in addition to front illumination. For example, some of our tests have left a residue on the back side of the glass fiber (i.e., on the side opposite to the incident laser beam). This residue is eliminated if back illumination is included.

Figure 6:
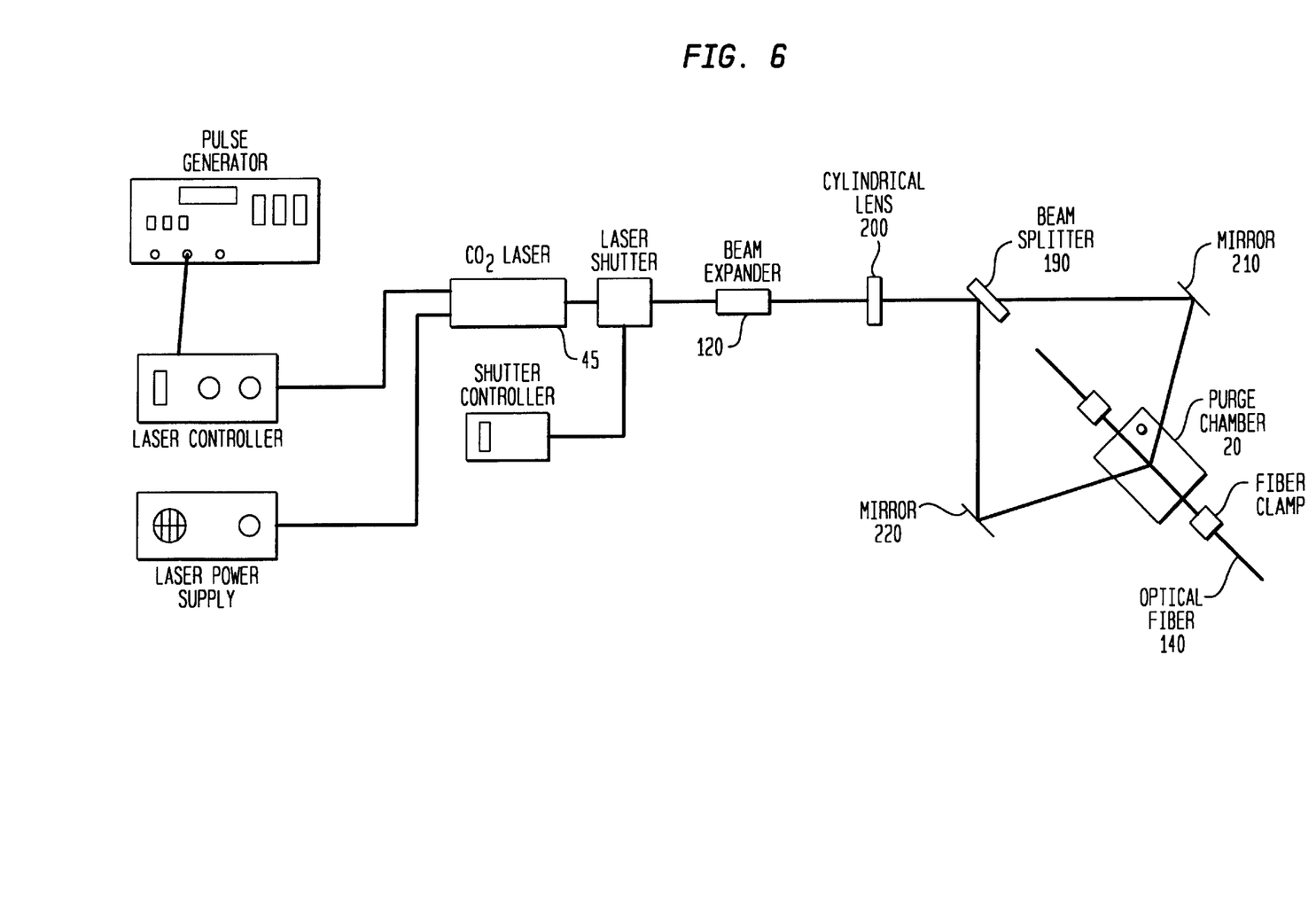
FIG. 6 is a schematic block diagram of an arrangement for irradiating an optical fiber with laser radiation, according to the invention in an alternate embodiment in which laser light is impinged on opposing sides of the optical fiber.

Back illumination is readily achieved, e.g., by providing an appropriate reflector, or by using a 50/50 beam splitter with appropriate mirrors to generate two beams simultaneously focused onto the front and back of the fiber, respectively. We have obtained good results using beam splitter 190 in combination with cylindrical lens 200 and a pair of totally reflecting mirrors 210, 220 as shown in FIG. 6.

Figure 7:
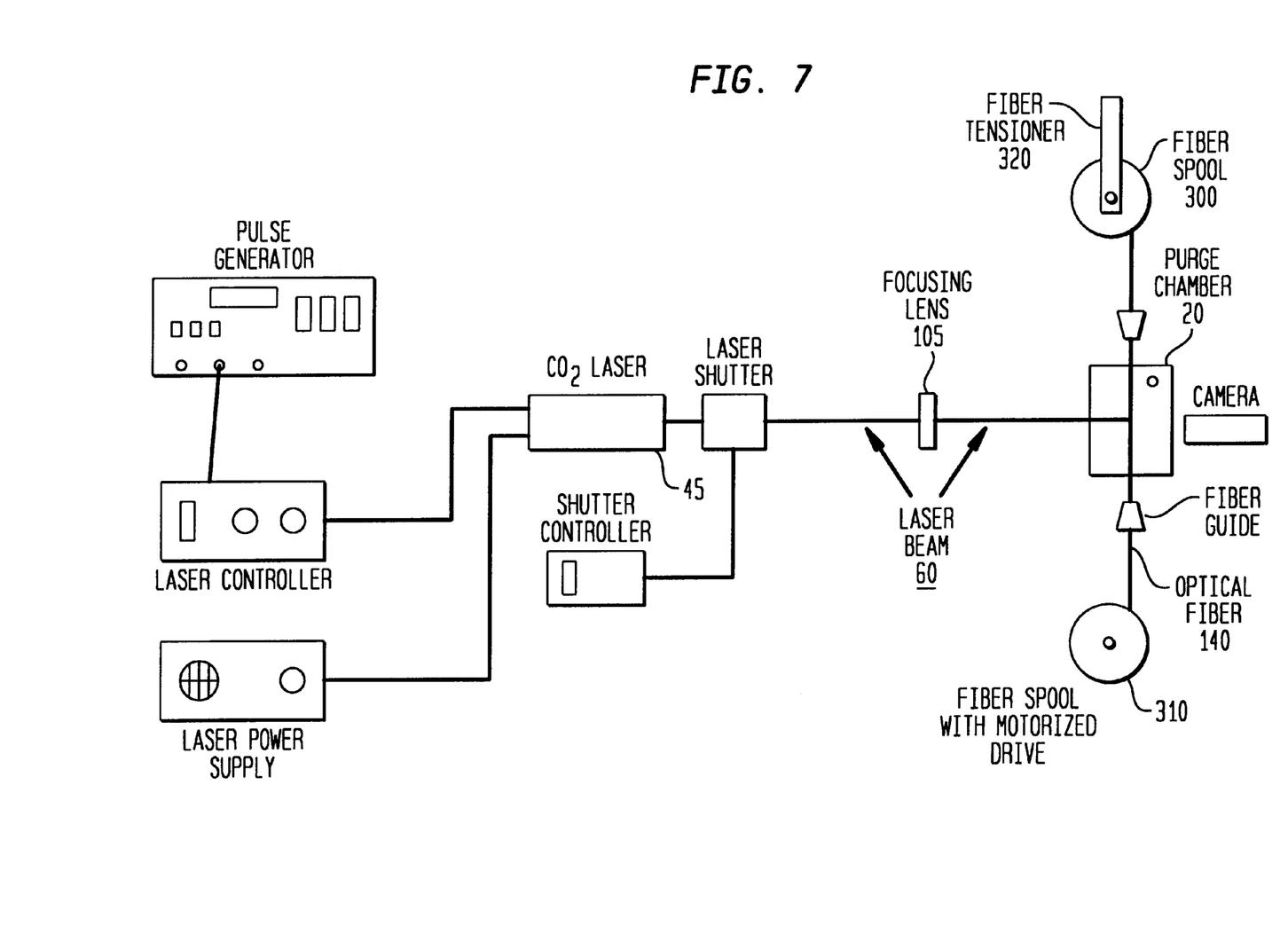
FIG. 7 is a schematic block diagram of an arrangement for irradiating an optical fiber with laser radiation, according to the invention in an alternate embodiment in which the optical fiber is translated from a supply spool to a take-up spool during the irradiation.

Another method for elongating the fiber section to be stripped of polymeric coating involves displacing the point along the fiber that is impinged by the laser beam, while illumination by the laser is taking place. This may be achieved by sweeping the laser beam along the fiber or, alternatively, by translating the fiber while maintaining a fixed laser beam. Sweeping of the beam is readily achieved, e.g., using any of various well known optical arrangements that include a rotatable or translatable mirror. Translation of the fiber is readily achieved, e.g., using a linear translation stage. Alternatively, as shown in FIG. 7, fiber translation is readily achieved by transferring fiber 140 from supply spool 300 to take-up spool 310.

By way of illustration, we have obtained good results with a fixed, 1-mm spot at the fiber by pulsing our laser at a pulse period of 3.65 ms and a pulse width of 400 $\mu$s, for a total of 125 pulses. We have obtained good results with a 7-mm, approximately elliptical spot, as described above, at a 4.25-ms period and 525-$\mu$s pulse width, for a total of 1300 pulses.

We have also obtained good results while continuously translating the optical fiber at a steady rate of 2.5 mm per second, while irradiating at a 3.65-ms pulse period and 450-$\mu$s pulse width. Adequate tension in the fiber is readily maintained, e.g., by operating a tensioner 320 on supply spool 300 while a drive motor turns take-up spool 310.

More generally, we have found that when using pulses as described above, a train of 100–300 pulses is generally sufficient to strip each millimeter of fiber. (However, it is desirable, in each individual case, to use the smallest effective number of pulses, in order to avoid excessive heating of the glass fiber.) We found that in dry nitrogen at a nominal power level of 12 W, a pulse period in the range 3.5–4.5 ms is generally effective with a pulse width of at least 200 $\mu$s, and preferably in the range 375–550 $\mu$s.

Still more generally, we believe that the pulse width will advantageously lie in the range 200–800 $\mu$s. Pulses shorter than this may fail to sufficiently heat the polymer coating to an adequate depth, whereas pulses longer than this may result in excessive heating of the glass fiber. Similarly, we believe that, at least for a laser spot about 1 mm in diameter, the peak pulse power will advantageously lie in the range 5–30 W. Pulses weaker than this may fail to adequately heat the polymer coating, whereas pulses stronger than this may cause excessive thermal loading of the glass fiber, resulting in strength degradation of the fiber. For more general ranges of spot sizes, we believe that the peak fluence of the laser pulses will advantageously lie in the range 0.5–4 kWcm$^{-2}$.

We have formulated a general rule that we believe will be helpful in determining appropriate doses for impingement on a fiber that is being translated. Let R be the diameter of the laser spot at the fiber. Let N be the number of pulses required (at a given pulse shape and pulse height) to remove the polymeric buffer layer from a fiber section of length R. Then the fiber is preferably displaced at a rate such that the laser is pulsed at least 0.8N times, but not more than 1.2N times during the time required to advance the point of impingement by R.

Those skilled in the art will appreciate that appropriate lasers are available that emit at various wavelengths within the infrared spectrum. We believe that any infrared wavelength will be useful for practicing the invention if it is substantially absorbed within the given thickness of the polymer coating. (By substantially absorbed we mean that the laser beam is attenuated by at least 90% as it traverses the original thickness of the coating.) It will further be appreciated that numerous chemical formulations are available for polymeric coatings on optical fibers. The absorption coefficient for any given infrared wavelength will vary, typically by as much as a factor of 2 or 3, or even more, between different such formulations.

We have found that in at least some cases, coating removal is promoted when significant optical absorption takes place in regions of the buffer layer lying relatively near the glass surface. For example, we have found effective removal when about 6% of the impinging radiation was permitted to reach the glass fiber. On the other hand, such deep penetration of the impinging radiation also tends to increase the thermal loading on the fiber. Accordingly, a preferred wavelength (for a given buffer layer composition and buffer layer thickness d) is one that is 90% absorbed at a depth of at least 0.5 d but not more than d.

The Example below describes an experimental trial in which we stripped a group of optical fibers in accordance with the inventive method. Associated with these fibers was a mean tensile strength of corresponding virgin fibers. By corresponding fibers is meant fibers from the same spool and having approximately the same cumulative exposure to water vapor. By virgin fiber is meant buffer-coated fiber that has just been taken from the spool. We found that most of the stripped fibers retained a tensile strength that lay within 10% of the associated mean tensile strength. We believe that when fibers are stripped according to our invention, results as good as this, or even better, will often be achievable with fibers of various kinds, and from various sources.

EXAMPLE

Ten samples of a standard Lucent Technologies Inc. dispersion shifted optical fiber with D-100 coating were stripped using pulsed radiation from a carbon dioxide laser while flushing with dry nitrogen, substantially as described above. The laser spot on the fiber was elongated using a 5-inch (12.7-cm) cylindrical lens. A train of 1300 pulses was used, having a period of 4.25 ms and a pulse width of 525 $\mu$s. The mean tensile strength of the stripped samples was 824 ksi, with a standard deviation of 65 ksi. A control group of 16 samples of virgin fiber was found to have a mean tensile strength of 857 ksi, with a standard deviation of 43 ksi.

Figure 8:
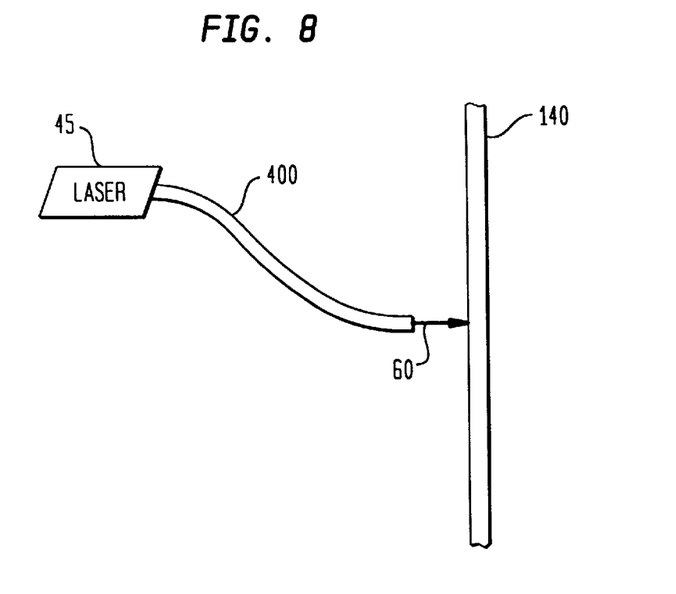
FIG. 8 is a schematic diagram illustrating the use of a waveguide to deliver laser light to the optical fiber, according to the invention in an alternate embodiment.

Various alternate realizations of the principles described above are also envisaged to lie within the scope of our invention. For example, laser beam 60 may be delivered to optical fiber 140 via an optical waveguide 400, as depicted, e.g., in FIG. 8. Particularly useful in this regard are flexible hollow waveguides. Waveguides of this kind are described, e.g., in U.S. Pat. No. 5,395,480, which issued to P. Bhardwaj et al. on Mar. 7, 1995, and U.S. Pat. No. 5,325,458, which issued to C. E. Morrow et al. on Jun. 28, 1994. Both of these patents are assigned to Sharplan Lasers, Inc., One Pearl Court, Allendale, N.J. 07401.

Figure 9:
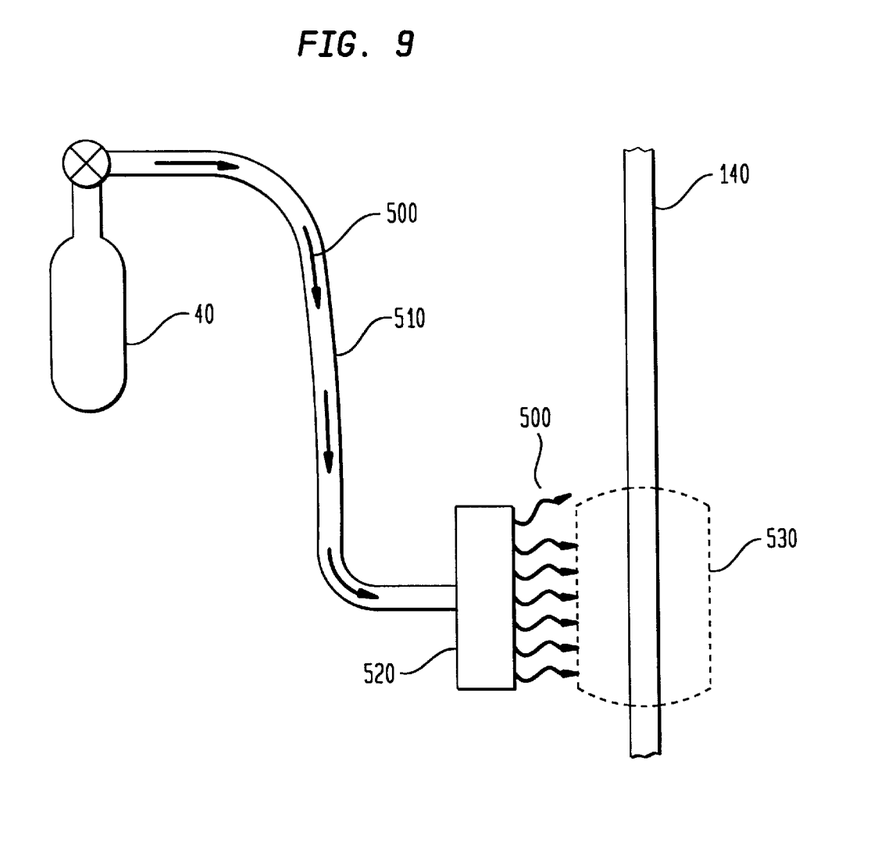
FIG. 9 is a schematic diagram illustrating the use of a hose terminated by a nozzle to deliver substantially non-oxidizing gas to the optical fiber, according to the invention in an alternate embodiment.

As a further example, illustrated in FIG. 9, the purge chamber may be omitted, and flow 500 of substantially non-oxidizing gas may instead be delivered through hose 510 terminated by nozzle 520. The gas is ejected from the nozzle onto fiber 140 and into a region 530 surrounding the fiber.

The invention claimed is:

1. A method for removing a polymeric coating from a longitudinal section of glass optical fiber, comprising:
   a) bathing the fiber section in a flow of a substantially non-oxidizing gas; and
   b) during the bathing step, ablating at least a portion of the polymeric coating of the fiber section by impinging a laser beam on the fiber section.

2. The method of claim 1, wherein the bathing step comprises situating the fiber section within a chamber, and flushing the chamber with the substantially non-oxidizing gas.

3. The method of claim 1, wherein the substantially non-oxidizing gas consists essentially of one or more gases selected from: hydrogen, helium, neon, argon, krypton, xenon, nitrogen, and the non-flammable gaseous fluorocarbons.

4. The method of claim 1, wherein the substantially non-oxidizing gas consists essentially of nitrogen.

5. The method of claim 2, wherein the substantially non-oxidizing gas consists essentially of nitrogen.

6. The method of claim 1, wherein the ablating step comprises impinging multiple laser pulses, each having a peak fluence of at least about 0.5 kWcm$^{-2}$ but not more than about 4 kWcm$^{-2}$.

7. The method of claim 6, wherein the multiple laser pulses have a width of at least about 200 $\mu$s but not more than about 800 $\mu$s.

8. The method of claim 1, wherein the polymeric coating has a thickness d, and the impinging step is carried out at a wavelength that is 90% absorbed by the polymeric coating at a depth therein of at least ½ d but not more than d.

9. The method of claim 1, wherein the ablating step is carried out using a carbon dioxide laser.

10. The method of claim 1, wherein the ablating step comprises impinging laser radiation on opposing sides of the optical fiber.

11. The method of claim 10, wherein laser radiation is directly incident on one side of the optical fiber, and the method further comprises reflecting laser radiation onto the side opposing the incident side.

12. The method of claim 10, comprising splitting the laser beam into two sub-beams and impinging the sub-beams on opposing sides of the optical fiber.

13. The method of claim 1, wherein the ablating step comprises interposing an optical element in the laser beam, such that the laser beam has an approximately elliptical cross section where it impinges on the optical fiber.

14. The method of claim 13, wherein the optical element is a cylindrical lens.

15. The method of claim 1, further comprising, during the ablating step, causing a relative displacement between the laser beam and the optical fiber, such that a point of impingement of the laser beam is displaced along the fiber.

16. The method of claim 15, wherein the displacement is caused by sweeping the laser beam.

17. The method of claim 15, wherein the displacement is caused by translating the fiber.

18. The method of claim 15, wherein the ablating step comprises impinging multiple laser pulses on the optical fiber.

19. The method of claim 18, wherein each of the multiple pulses has a peak fluence of at least about 0.5 kWcm$^{-2}$ but not more than about 4 kWcm$^{-2}$.

20. The method of claim 18, wherein each of the multiple pulses has a width of at least about 200 $\mu$s but not more than about 800 $\mu$s.

21. The method of claim 18, wherein the displacement takes place at a constant rate.

22. The method of claim 21, wherein the laser beam has a spot size R at the fiber, the number of pulses required to remove polymeric coating from a fiber section of length R is N, and the displacement rate is such that the laser is pulsed at least 0.8 N times but not more than 1.2 N times during the time required to advance the point of impingement by R.

23. The method of claim 1, wherein a mean tensile strength is associated with the optical fiber, and the ablating step is carried out such that after said impinging step, the tensile strength remains within 10% of said mean tensile strength.

24. The method of claim 1, wherein the bathing and ablating steps are carried out on an optical fiber that has not previously been exposed to a chemical agent which softens the polymeric coating.

25. The method of claim 1, wherein the ablating step comprises delivering the infrared laser beam to the fiber section via an optical waveguide.

26. The method of claim 1, wherein the bathing step comprises delivering the substantially non-oxidizing gas to the fiber section via a hose terminated by a nozzle.

27. The method of any of claims 1, 2, 3, 4, 5, 6, 7, 8, 9, 10, 11, 12, 13, 14, 15, 16, 17, 18, 19, 20, 21, 22, 23, 24, 25, or 26, wherein the impinging laser beam substantially comprises infrared radiation.

* * * * *